(12) United States Patent
Rappl et al.

(10) Patent No.: US 8,330,077 B2
(45) Date of Patent: Dec. 11, 2012

(54) REMOTE WELDING SYSTEM AND METHOD

(75) Inventors: James Francis Rappl, Neenah, WI (US); Thomas D. Ihde, Appleton, WI (US); Jeffery R. Ihde, Greenville, WI (US); Joseph Edward Feldhausen, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 633 days.

(21) Appl. No.: 12/553,796

(22) Filed: Sep. 3, 2009

(65) Prior Publication Data
US 2011/0049116 A1 Mar. 3, 2011

(51) Int. Cl.
*B23K 9/10* (2006.01)
(52) U.S. Cl. .................. 219/130.1; 219/130.5; 219/132; 219/136; 219/137 R; 219/137 PS
(58) Field of Classification Search ............... 219/130.1, 219/130.5, 132, 136, 137 R, 137 PS
See application file for complete search history.

(56) References Cited

U.S. PATENT DOCUMENTS

| | | | | | |
|---|---|---|---|---|---|
| 3,621,177 | A | * | 11/1971 | McPherson et al. | 219/137 PS |
| 3,808,397 | A | * | 4/1974 | Wixson | 219/132 |
| 4,093,845 | A | * | 6/1978 | Hairgrove, Sr. | 219/132 |
| 4,119,830 | A | * | 10/1978 | Gilliland | 219/132 |
| 4,151,396 | A | * | 4/1979 | Veal | 219/132 |
| 4,216,367 | A | * | 8/1980 | Risberg | 219/132 |
| 4,467,174 | A | * | 8/1984 | Gilliland | 219/132 |
| 4,508,954 | A | * | 4/1985 | Kroll | 219/132 |
| 5,406,050 | A | * | 4/1995 | Macomber et al. | 219/132 |
| 5,990,446 | A | * | 11/1999 | Zhang et al. | 219/137 PS |
| 6,075,225 | A | * | 6/2000 | Heraly et al. | 219/130.5 |
| 6,103,994 | A | * | 8/2000 | DeCoster et al. | 219/132 |
| 6,570,132 | B1 | * | 5/2003 | Brunner et al. | 219/132 |
| 6,720,678 | B2 | * | 4/2004 | Green et al. | 219/132 |
| 6,781,095 | B2 | * | 8/2004 | Hayes et al. | 219/132 |
| 6,855,912 | B2 | * | 2/2005 | Houston et al. | 219/132 |
| 6,906,285 | B2 | * | 6/2005 | Zucker et al. | 219/132 |
| 6,933,467 | B2 | * | 8/2005 | Hayes et al. | 219/132 |

(Continued)

FOREIGN PATENT DOCUMENTS

EP 1500456 A1 1/2005

OTHER PUBLICATIONS

International Search Report for application No. PCT/US2010/038814 mailed Oct. 20, 2010.

*Primary Examiner* — Trong Phan
(74) *Attorney, Agent, or Firm* — Fletcher Yoder, P.C.

(57) ABSTRACT

Embodiments of a pendant associated with a multi-process welding power supply that allows a user to switch processes and reverse an output polarity while located remotely from a power supply unit are provided. Certain embodiments include a pendant with a wire spool and wire feeder drive circuitry that is configured to activate spooling during MIG welding. Control circuitry that may include processing circuitry and memory is provided. The control system may disable redundant controls on the power supply unit user interface when the power supply unit is connected to the pendant via a supply cable. Additionally, the control system may set the process, set the polarity, enable or disable a wire feed, and enable or disable gas flow according to inputs received via a user interface on either the power supply unit or the pendant.

20 Claims, 6 Drawing Sheets

U.S. PATENT DOCUMENTS

| | | | |
|---|---|---|---|
| 7,180,029 B2 * | 2/2007 | Ott | 219/132 |
| 7,205,503 B2 * | 4/2007 | Reynolds et al. | 219/132 |
| 7,247,814 B2 * | 7/2007 | Ott | 219/132 |
| 7,294,808 B2 * | 11/2007 | Furman et al. | 219/132 |
| 7,307,241 B2 * | 12/2007 | Hayes | 219/132 |
| 7,952,051 B2 * | 5/2011 | Veik et al. | 219/137 PS |
| 2006/0138113 A1 | 6/2006 | Ott | |
| 2007/0080154 A1 | 4/2007 | Ott et al. | |
| 2007/0114216 A1 | 5/2007 | Ott | |
| 2008/0035621 A1 | 2/2008 | Veik et al. | |

* cited by examiner

REMOTE WELDING SYSTEM AND METHOD

BACKGROUND

The invention relates generally to welding systems, and more particularly to a pendant located remotely from a multi-process welding power source.

Traditional single process welding systems support a variety of processes, such as metal inert gas (MIG) welding, tungsten inert gas (TIG) welding, stick welding, and so forth, which may operate in different modes, such as constant current or constant voltage. Such welding systems typically include a single output connection and, therefore, are configured to support a single process at a time. In contrast to these single process welding systems, multi-process welding systems may connect to and support multiple processes at the same time. While single process welding systems only need to support a single output polarity, multi-process welding systems require two different polarities, including industry standard direct current electrode positive (DCEP) and direct current electrode negative (DCEN).

Certain multi-process welding applications, such as coal-fired boiler repair, shipyard work, and so forth, may include large distances between a workpiece and the multi-process welding power source. In such applications, switching between DCEP and DCEN processes traditionally requires a manual adjustment to a knob or switch proximate to the welding power source, and even connection of entirely different welding cables to the source, particularly when the welder uses stick or MIG processes for some of the work, and a TIG process for other work, typically finer or more intricate tasks. Accordingly, the location of power terminals (e.g., plugs) and controls on or proximate to the welding power source may require the user to stop welding and return to the power source to change the polarity. In many applications, this may entail walking back considerable distances, through sometimes complex and intricate work environments. Therefore, substantial amounts of time and effort may be required to change polarity in multi-process welding applications. Such arrangements also may result in long runs of heavy secondary weld cables and gas conduits, making movement difficult, and requiring careful tracking of which cable corresponds to which process. While some time loss can be avoided by stationing a person at the power source dedicated to making needed adjustments, this adds considerably to the cost of the operations.

Accordingly, there exists a need for more convenient systems and methods for switching output polarity in multi-process welding systems, particularly in environments where the welding operation is carried on at a considerable distance from the welding power source.

BRIEF DESCRIPTION

The present invention provides solutions for such welding applications. In accordance with certain embodiments, a pendant or remote access device is associated with a multi-process welding power supply to allow a user to switch processes and reverse an output polarity while located remotely from a power supply unit. The disclosed embodiments may include a pendant with a wire spool and wire feeder drive circuitry that is configured to activate spooling during MIG welding. In some embodiments, gas valves may be located in the pendant and may receive one or more gas inputs from gas cylinders remotely located with respect to the pendant (e.g., near the power supply). Control circuitry that may include processing circuitry and memory is provided. The control system may disable redundant controls on the power supply unit user interface when the power supply unit is connected to the pendant via a supply cable. Additionally, the control system may set the process, set the polarity, enable or disable a wire feed, and enable or disable gas flow according to inputs received via a user interface on either the power supply unit or the pendant.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in further detail below, various embodiments of a pendant associated with a multi-process welding power supply are provided to allow a user to switch processes and reverse an output polarity while located remotely from a power supply unit. In general, as used herein the term "pendant" refers to a welding power access and/or control device that is designed to be coupled to a welding power supply to provide power to at least two different welding processes at a remote welding location. The pendant may be configured to lock out redundant controls on the welding power supply when controls on the pendant are enabled, and able to reverse a polarity output at outlets located on a user interface. Moreover, the pendant may include or be included in a wire feeder. It may be designed to permit remote switching between constant current, constant voltage, and regulated metal deposition (i.e., a hybrid between constant current and constant voltage) outputs. It may also be capable of switching between one or more types of gas, and so forth. The disclosed embodiments include a pendant with a wire spool and wire feeder drive circuitry that is configured to activate spooling during MIG welding. In some embodiments, gas valves may be located in the pendant and may receive one or more gas inputs from gas cylinders remotely located with respect to the pendant.

Control circuitry that may include processing circuitry and memory is provided, as also discussed below. The memory may include volatile or non-volatile memory, such as read only memory (ROM), random access memory (RAM), magnetic storage memory, optical storage memory, or a combination thereof. Furthermore, a variety of control parameters may be stored in the memory along with code configured to provide a specific output (e.g., initiate wire feed, enable gas flow, etc.) to the pendant during operation. As discussed below, the control system may disable redundant controls on the power supply unit user interface when the power supply unit is connected to the pendant via a supply cable. Additionally, the control system may set the process (e.g., set constant current, constant voltage, or regulated metal deposition), set the polarity (e.g., set DCEN or DCEP), enable or disable a wire feed, and enable or disable gas flow according to inputs received via a user interface on either the power supply unit or the pendant.

Figure 1:
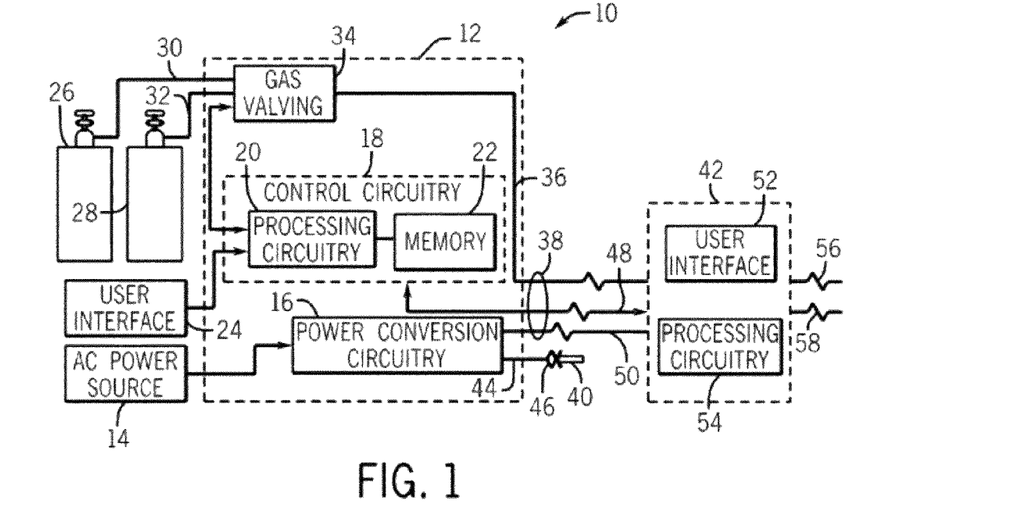
FIG. 1 is a diagram of an exemplary welding system having a multi-process power supply and a pendant in accordance with aspects of the present invention.

Turning now to the drawings, FIG. 1 is a diagram of an exemplary welding system 10 including a multi-process welding power supply 12 in accordance with aspects of the present invention. The multi-process power supply 12 is configured to supply power to a plurality of welding devices (e.g., MIG torch, TIG torch, stick electrode, etc.) associated with a variety of welding processes (e.g., MIG, TIG, stick, etc.). In certain embodiments, the power supply 12 receives input power from an alternating current power source 14 (e.g., the AC power grid, an engine/generator set, a battery, or a combination thereof), conditions the input power, and provides an output power to one or more welding devices in accordance with demands of the system 10. Accordingly, in some embodiments, the power source 12 may include power conversion circuitry 16 that includes circuit elements such as transformers, rectifiers, switches, and so forth, capable of converting the AC input power to a DCEP or DCEN output as dictated by the demands of the system 10. Such circuits are generally known in the art.

The power supply 12 also includes control circuitry 18 that is configured to receive and process a plurality of inputs regarding the performance and demands of the system 10. The control circuitry 18 includes processing circuitry 20 and memory 22. As mentioned above, the memory 22 may include volatile or non-volatile memory, such as ROM, RAM, magnetic storage memory, optical storage memory, or a combination thereof. Furthermore, a variety of control parameters may be stored in the memory 22 along with code configured to provide a specific output (e.g., initiate wire feed, enable gas flow, etc.) during operation. The processing circuitry 20 may also receive an input from a user interface 24 located on the power supply 12, through which the user may choose a process, and input desired parameters (e.g., voltages, currents, particular pulsed or non-pulsed welding regimes, and so forth).

The power supply 12 may also include one or more gas tanks 26, 28. The gas tanks 26 and 28 may supply shielding gases, such as argon, helium, carbon dioxide, and so forth, via hoses 30 and 32, respectively. In the embodiment illustrated in FIG. 1, the gases enter gas valving 34 located in the power supply 12. The gas valving 34 communicates with the processing circuitry 20 to determine which gas and the amount of that gas to output via a gas conduit 36. A plurality of conduits 38 couple the power supply 12 to a workpiece 40 and a pendant 42. In the illustrated embodiment, the plurality of conduits 38 is shown as a group of individual connections to the pendant 42. However, it should be noted that in alternate embodiments, the plurality of conduits 38 may be bundled into a single supply cable that connects the power supply 12 to the pendant 42. In such embodiments, the foregoing feature, among others, may have the effect of reducing the number of cables present in the welding area with respect to traditional systems.

A lead cable 44 terminating in a clamp 46 couples the power conversion circuitry 16 to the workpiece 40 and closes the circuit between the power source 12, the workpiece 40, and a welding device (e.g., MIG torch, TIG torch, stick electrode, etc.). In a presently contemplated embodiment, the plurality of conduits 38 includes the gas conduit 36, a data conduit 48, and a power conduit 50. The power conduit 50 transfers the output of the power conversion circuitry 16 to the pendant 42 to power the welding process during operation. The data conduit 48 bidirectionally communicatively couples the pendant 42 to the control circuitry 18 in the power supply 12. That is, data conduit 48 may transmit information both from the pendant 42 to the power supply 12 and from the power supply 12 to the pendant 42.

In the illustrated embodiment, the pendant 42 includes a user interface 52, through which a user may choose a process (e.g., MIG, TIG, stick, etc.), control the voltage, control the current, and so forth, while remotely located with respect to the power supply unit 12. The user interface 52 may also allow the user to electrically isolate welding devices (e.g., MIG torch, TIG torch, etc.) when not in use. For instance, if the user switches from a MIG welding process to a TIG welding process, the pendant 42 may allow the user to keep both the MIG torch and the TIG torch connected to outlets located on the pendant 42 (e.g., without the need to unplug conductors and a gas conduit for one and plug in conductors and a gas conduit for the other). However, a switch located on the user interface 52 may allow the user to electrically isolate the MIG torch such that only the TIG torch is active or "hot" during the weld.

In addition to the user interface 52, the pendant 42 also may include processing circuitry 54 that receives inputs from the power supply 12 and the user interface 52, processes the inputs, and generates output data that may be communicated back to the power supply 12. The pendant 42 in the illustrated embodiment includes two output connections 56 and 58, which may be coupled to welding devices that require either a DCEN or a DCEP process. For instance, a TIG torch may be connected to the first output connection 56 and a stick welding stinger may be connected to the second output connection 58. Alternatively, the stick welding stinger may be connected to the first output connection 56 and the TIG torch may be connected to the second output connection 58. That is, the output terminals on the pendant 42 may be interchangeable between devices requiring DCEN or DCEP processes since the pendant 42 is configured to reverse the polarity of the outputs to the output connections 56 and 58 depending upon the active or selected process.

In certain embodiments, the pendant 42 may be located in close proximity to the welding operation but distant from the power supply 12. For instance, coal-fired boiler welding applications, shipyard applications, construction sites, and so forth often require a welding operator to be located distant from the power supply 12. Since the pendant 42 may be located close to the weld, the current system 10 may have the effect of reducing the amount of time and effort that the welding operator traditionally spends returning from the site of the weld to the power supply in instances when the polarity of the welding process must be reversed, adjustments must be made to the process settings, or process cables must be changed. Such instances may include demands that give rise to the need to switch between MIG, TIG, and stick welding processes.

Figure 2:
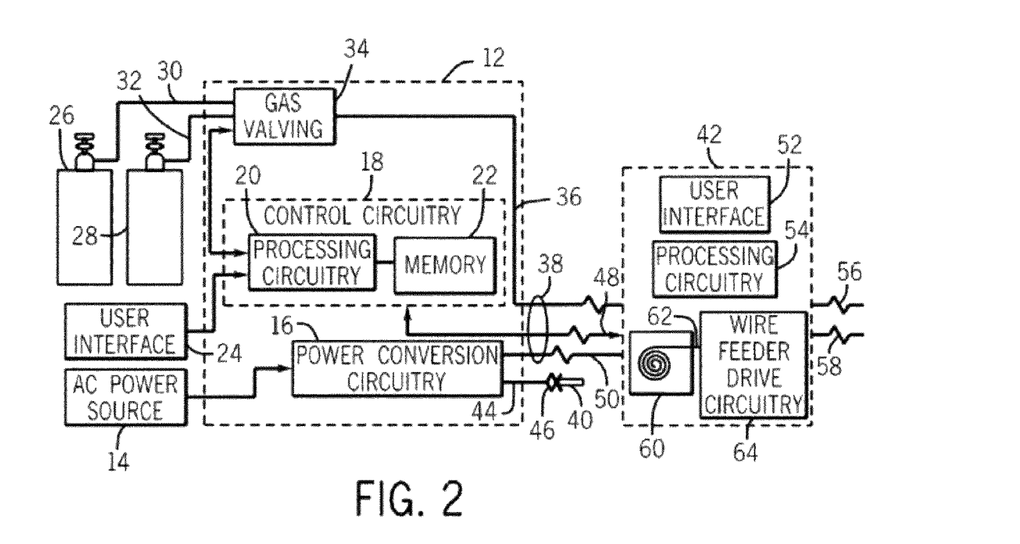
FIG. 2 is a diagram of an exemplary welding system having a multi-process power supply and a pendant including a wire feeder in accordance with aspects of the present invention.
Figure 3:
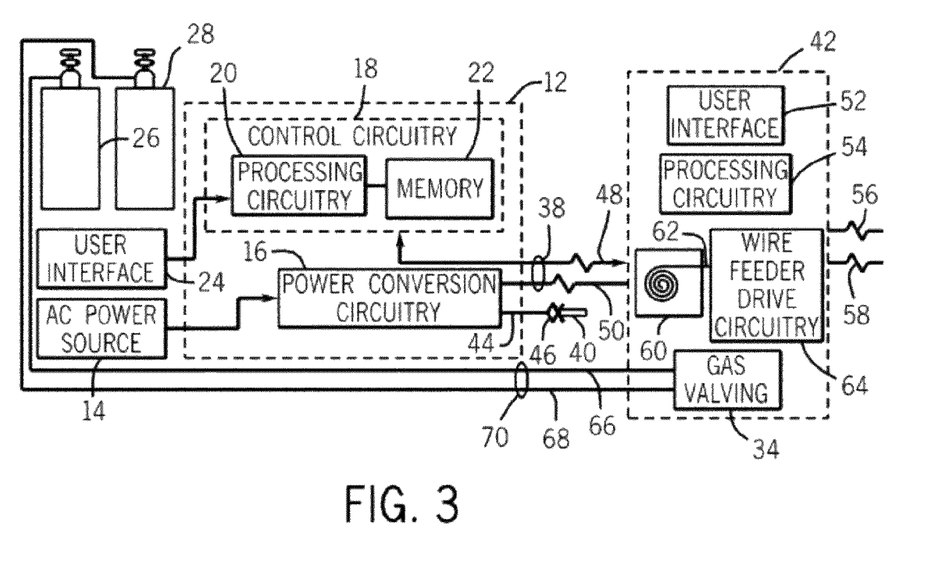
FIG. 3 is a diagram of an exemplary welding system having a multi-process power supply and a pendant including a wire feeder and gas valving in accordance with aspects of the present invention.

In the embodiment illustrated in FIG. 1, a wire feeder (not shown) for use with MIG welding operations may be a stand-alone unit located in close proximity to the pendant 42. In alternate embodiments, as illustrated in FIGS. 2 and 3, the wire feeder may be located in or on the pendant 42, or the pendant itself may be incorporated with the wire feeder. For instance, in the embodiments illustrated in FIGS. 2 and 3, a wire spool 60 feeds wire 62 into a wire feeder driver 64, which contains circuitry that initiates a wire feed to the MIG torch during MIG welding operations.

In the embodiments illustrated in FIGS. 1 and 2, the single gas conduit 36 provides the means for the gas suitable for the given welding process to be transferred from the power supply 12 to the pendant 42. Gas valving 34 located in the power supply 12 modulates the release of the proper gas for a given operation and purges the gas conduit 36 accordingly when the user switches between processes. That is, the gas valving may include directional control valving that selects the gas source depending upon the active or selected process. However, in alternate embodiments, as illustrated in FIG. 3, a plurality of gas conduits 66 and 68 may supply the pendant 42 with the gas suitable for a given welding operation. Such embodiments may eliminate the need for purging of the gas conduit 36 when the user switches between processes. In further embodiments, the plurality of gas conduits 66 and 68 may be bundled together in a single supply cable, as indicated by reference numeral 70. In alternate embodiments, the gas conduits 66 and 68 may be bundled in a supply cable with the data conduit 48 and the power conduit 50. In the embodiment of FIG. 3, the gas valving 34 may therefore be located in the pendant 42 rather than in the power supply 12 as compared to FIGS. 1 and 2.

Figure 4:
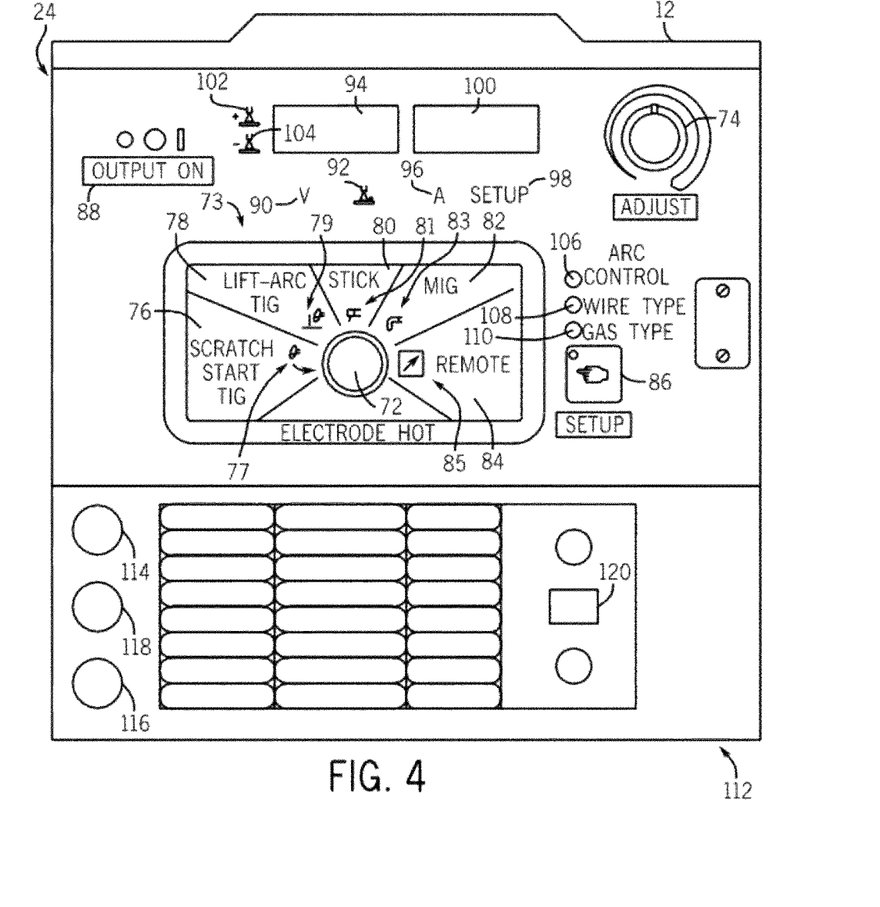
FIG. 4 illustrates an exemplary user interface for a multi-process welding power supply unit in accordance with aspects of the present invention.

FIG. 4 illustrates the power supply unit 12 of FIGS. 1-3 including an exemplary user interface 24. The user interface 24 in the illustrated embodiment includes light emitting diodes (LEDs) positioned under process symbols that are configured to illuminate when a process is selected. In a presently contemplated embodiment, the user selects a welding process via a knob 72. As the user turns the knob 72, selections are illuminated by LEDs located behind process panels. A selection panel 73 includes multiple sub-panels that allow the user to choose the welding process. For instance, in the illustrated embodiment, the selection panel 73 includes a scratch start TIG panel 76 with a TIG icon 77, a lift-arc TIG panel 78 with a second TIG icon 79, a stick panel 80 with a stick icon 81, a MIG panel 82 with a MIG icon 83, and a remote panel 84 with a remote icon 85. When the user turns the knob 72 to illuminate the panel associated with a suitable process, the user selection is communicated to the user via light activation of the appropriate icon. For instance, if the user turns knob 72 to the MIG panel 82, the MIG icon 83 is illuminated via LEDs located behind the MIG panel 82. Additionally, the power supply 12 receives and processes the MIG user selection.

The user may turn the knob 72 such that the remote panel 84 and the remote icon 85 are illuminated. In such instances, controls on the power supply 12 which are redundant with those on the user interface 52 of the pendant 42 are disabled. Additionally, in one embodiment, when a supply cable connecting the power supply 12 to the pendant 42 is detected, the power supply unit 12 automatically selects the remote process position and the remote panel icon 85 illuminates. Further control over process selection can then only be accomplished via controls located on the pendant 42. That is, detection of communication between the power supply 12 and the pendant 42 locks out controls on the power supply 12 and relegates control to the pendant 42 in use. When the pendant 42 is detected, the user may depress a setup button 86, which allows the power supply unit 12 to display process settings. However, the knob 72 remains deactivated, prohibiting the user from changing the displayed process settings. The foregoing features, among others, may have the effect of reducing accidental setting changes made by non-operators while the user is performing a welding operation in a location remotely located with respect to the power supply unit 12. Alternatively, enabling the pendant controls and disabling the power supply controls may be manual.

In the illustrated embodiment, the selection panel 73 includes a variety of sub-panels corresponding to a variety of welding processes and a sub-panel corresponding to a remote operation mode. However, it should be noted that in other embodiments, the selection panel 73 may include more or fewer sub-panels that correspond to different processes or modes. For instance, in one embodiment, the remote panel 84 may be eliminated. That is, in certain embodiments, the system may be intelligently designed such that the remote panel 84 is not necessary for operation of the device.

During operation, after setting the welding process via knob 72, the user may utilize the setup button 86 in conjunction with panels 94 and 100 and knob 74 to set parameters associated with the chosen weld process. For instance, in one embodiment, the user may first position the knob 72 to select the MIG panel 82, which will cause the MIG indicator 83 to illuminate. The user may then press the setup button 86, which will cause the control indicator 106 to illuminate. Pressing the setup button again will cause the wire type indicator 108 to illuminate. Panel 94 may then display the default diameter of the welding wire, and panel 100 may display the default type of welding wire. The user may use knob 74 to adjust the wire diameter and wire type. As the user turns knob 74, the panels 94 and 100 display the chosen wire diameter and wire type. The user may then press the setup button 86 again, which will cause the gas type indicator 110 to illuminate. The user may then use knob 74 to adjust the type of gas desired for the given application. As the user turns knob 74, the chosen gas is displayed on panels 94 and 100. In this way, the user may utilize the user interface 24 to set both the welding process and the parameters associated with the chosen process.

The user interface 24 on the power supply unit 12 also includes an output indicator panel 88, which visually indicates the active status of the power supply unit 12 to the user during operation. A volt indicator 90 and an arc length indicator 92 cooperate with a left display panel 94 to communicate the volts and arc length of the welding operation, respectively, to the user. Similarly, an amp indicator 96 and a setup indicator 98 cooperate with a right display panel 100 to communicate the amps and setup of the welding operation, respectively, to the user. A DCEP indicator 102 and a DCEN indicator 104 communicate the polarity of the welding process to the user via LEDs located behind the user interface 24. An arc control indicator 106, a wire type indicator 108, and a gas type indicator 110 communicate process details to the user.

In the illustrated embodiment, a bottom panel 112 of the power supply unit 12 may include an output terminal 114 configured to support a welding electrode and an output terminal 116 configured to support a work clamp. Additionally, the bottom panel 112 may include a gas valve terminal 118 that is configured to connect to a gas conduit. The bottom panel 120 may also include a power switch 120, which may be used to turn the power supply unit 12 on and off.

Figure 5:
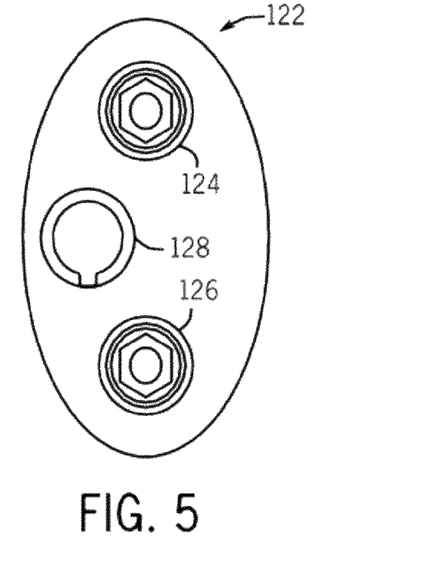
FIG. 5 illustrates an exemplary outlet configuration for a multi-process welding power supply in accordance with aspects of the present invention.

FIGS. 5-8 illustrate possible output terminal configurations that may be included on the power supply unit 12 and/or the pendant 42. It should be understood, however, that these are exemplary only, and many other configurations may be envisaged. FIG. 5 illustrates a configuration 122 of output terminals that may be located on the power supply unit 12 in some embodiments. In this embodiment, a first outlet 124 is configured to receive a workpiece connector, a second outlet 126 is configured to receive a connector for a supply cable that terminates at the pendant 42, and a third outlet 128 is configured to receive a gas connector. In some embodiments, the gas connector and the supply cable connector may be a single connector configured to engage with both outlets 126 and 128.

Figure 6:
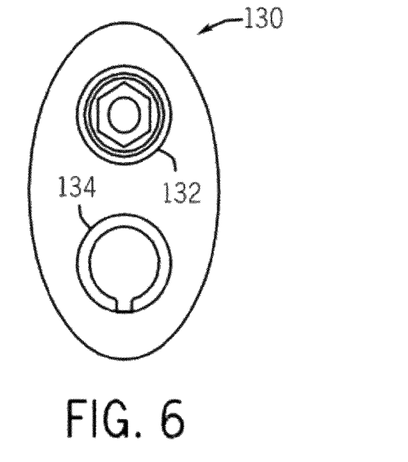
FIG. 6 illustrates an exemplary outlet configuration for a pendant associated with a multi-process welding power supply in accordance with aspects of the present invention.

FIG. 6 further illustrates a configuration 130 of terminals that may be located on the pendant 42 in certain embodiments. The configuration 130 includes a power outlet 132, which is configured to receive a power lead, and a gas outlet 134, which is configured to receive a gas lead. It should be noted that in certain embodiments, the power lead and the gas lead may be located in a single connector that is configured to attach to both the power outlet 132 and the gas outlet 134. Furthermore, it should be noted that in the illustrated embodiment the power outlet 132 may be polarity independent and therefore may be suitable for use with TIG torches, MIG torches, stick stingers, or a combination thereof, the polarity being determined and switched depending upon the process that is active or selected.

Figure 7:
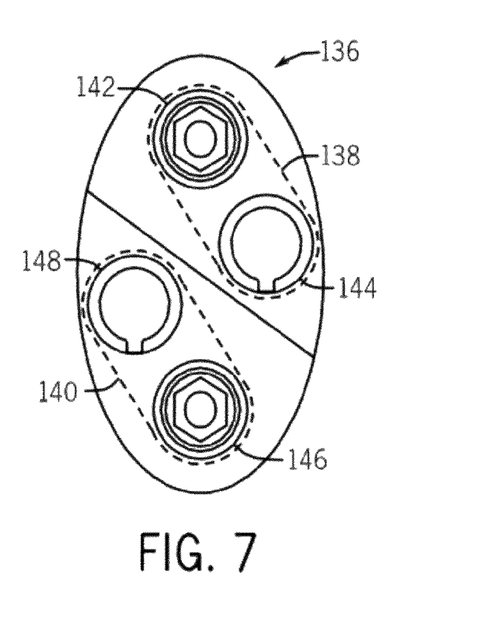
FIG. 7 illustrates another exemplary outlet configuration for a pendant associated with a multi-process welding power supply in accordance with aspects of the present invention.

FIG. 7 illustrates another possible configuration 136 of outlets that may be located on the pendant 42 in certain embodiments. In the illustrated embodiment, the configuration 136 includes a first outlet subset 138 configured for use with MIG or stick welding processes and a second outlet subset 140 configured for use with TIG welding processes. The first outlet subset 138 includes a first power outlet 142 configured for use with direct current electrode positive (DCEP) processes, such as MIG or stick welding processes. The first outlet subset 138 also includes a first gas outlet 144 configured to output a gas, such as carbon dioxide, suitable for use with MIG welding processes. The second outlet subset 140 includes a second power outlet 146 configured for use with direct current electrode negative (DCEN) processes, such as TIG welding processes. The second outlet subset 140 also includes a second gas outlet 148 configured to output a gas, such as argon, suitable for use with TIG welding processes. It should be noted that in certain embodiments, a first power lead and a first gas lead may be located in a single first connector that is configured to attach to both the first power outlet 142 and the first gas outlet 144. Similarly, in certain embodiments, a second power lead and a second gas lead may be located in a single second connector that is configured to attach to both the second power outlet 146 and the second gas outlet 148.

Figure 8:
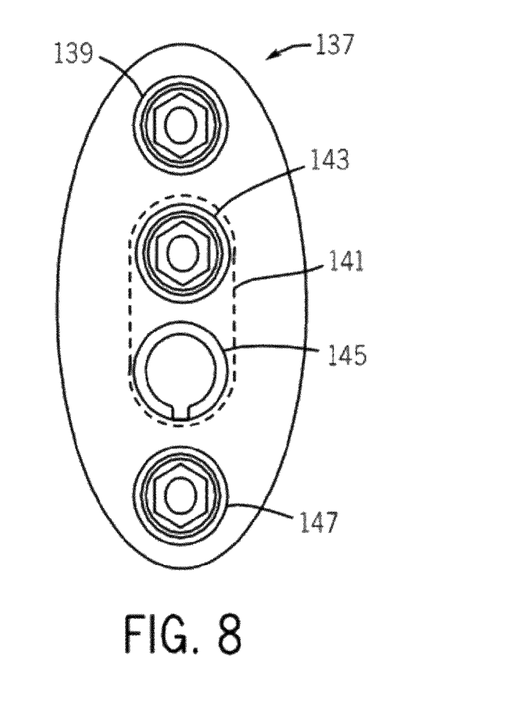
FIG. 8 illustrates an additional exemplary outlet configuration for a multi-process welding power supply in accordance with aspects of the present invention.

FIG. 8 illustrates another possible configuration 137 of outlets that may be located on the welding power supply 12 in certain embodiments. In the illustrated embodiment, the configuration 137 includes a first outlet 139 that is configured to receive an electrode, an outlet subset 141 that is configured to receive an electrode and gas connector, and a second outlet 147 that is configured to receive a workpiece connector. The outlet subset 141 includes a first electrode outlet 143 configured to output power at a desired polarity and a first gas outlet 145 configured to output a gas suitable for the chosen process. In the illustrated embodiment, the configuration 137 is suitable for use in instances where a power lead and a gas lead may be located in a single connector that is configured to attach to both the power outlet 143 and the gas outlet 145. The illustrated configuration 137 is also suitable for use in welding processes that do not require gas, since outlet 139 may accommodate a single electrode.

Figure 9:
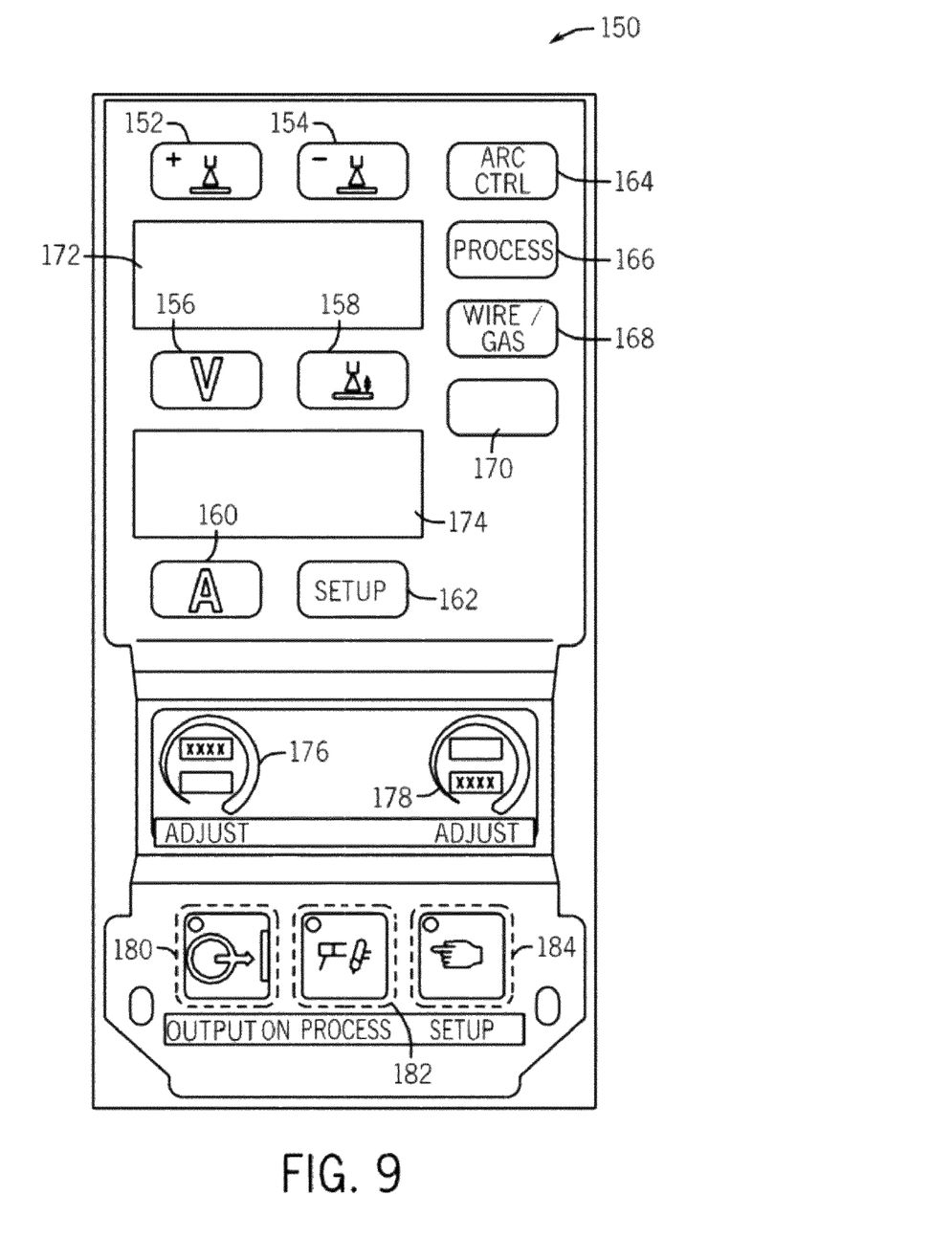
FIG. 9 illustrates an exemplary user interface for a pendant associated with a multi-process welding power supply unit in accordance with aspects of the present invention.

FIG. 9 illustrates an exemplary user interface 150 that may be located on the pendant 42 located remotely with respect to the multi-process welding power supply unit 12. In the illustrated embodiment, the user interface includes a DCEP indicator 152 and a DCEN indicator 154, which communicate the polarity of the welding process to the user. The user interface 150 also includes a volts indicator 156 and an arc length indicator 158, which communicate the volts and arc length of the welding operation, respectively, to the user during operation. Similarly, an amps indicator 160 and a setup indicator 162 communicate the amps and setup conditions of the welding operation, respectively, to the user. An arc control indicator 164, a process indicator 166, and a wire/gas type indicator 168 communicate process details to the user. Supplemental indicators 170 may indicate additional features of the welding operation, such as whether the process is operating in constant current, constant voltage, or regulated deposition mode. Additionally, a power button 180 allows the user to enable or disable the secondary weld output power flow to the pendant 42.

In some embodiments, process indicators 152, 154, 156, 158, 160, 162 may cooperate with display panels 172 and 174 to communicate information to the user. For instance, in one embodiment, during operation, the user may press process button 182 to set the welding process via control knobs 176 and 178. That is, when the user presses process button 182, the default weld process will be communicated to the user via panels 172 and 174, and the process indicator 166 will illuminate. The user may then adjust knobs 176 and 178 to change the welding process. As the user changes the welding process, the chosen welding process will be displayed on panels 172 and 174. The user may further utilize knobs 176 and 178 in conjunction with panels 172 and 174 and setup button 184 to set parameters associated with the chosen weld process. In this way, the user may utilize the user interface 150 to set both the welding process and the parameters associated with the chosen process.

Figure 10:
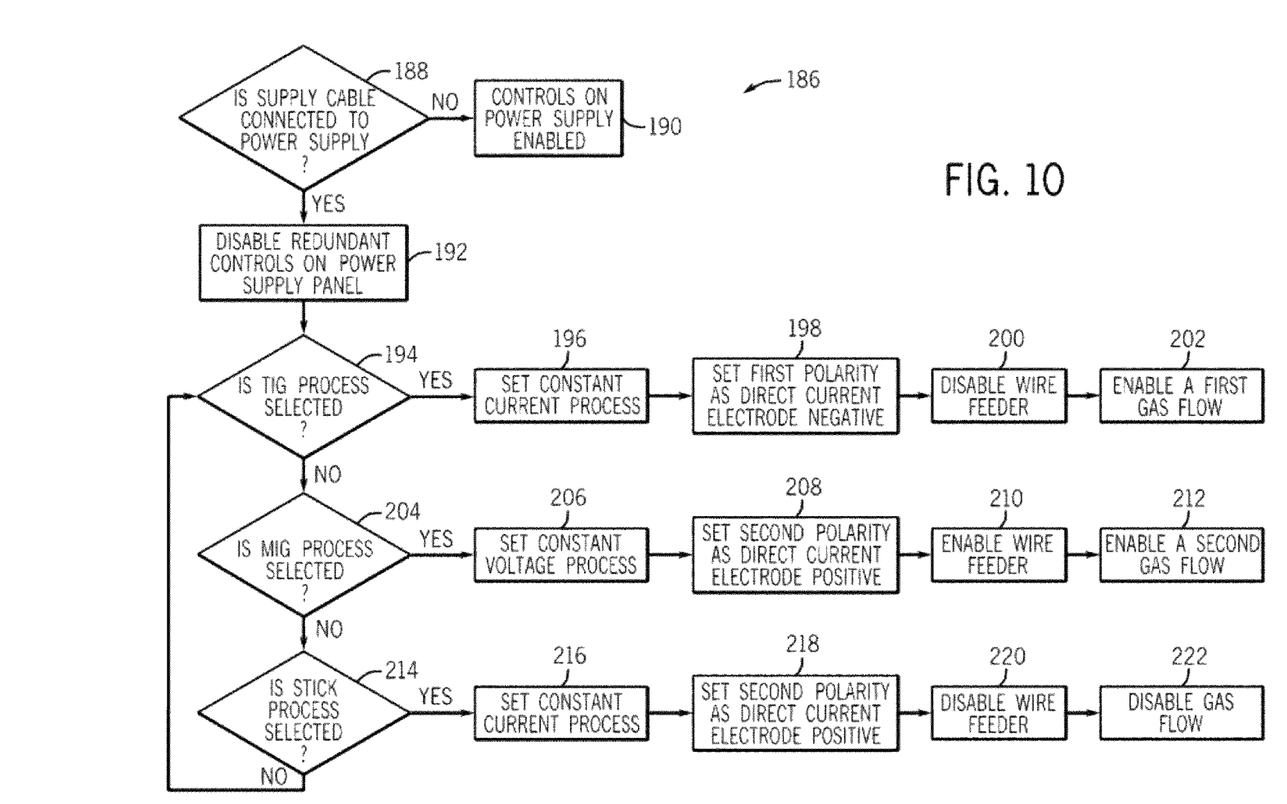
FIG. 10 is a block diagram illustrating exemplary logic that may be used by a control system to operate a multi-process power supply in conjunction with a pendant in accordance with aspects of the present invention.

FIG. 10 illustrates exemplary logic 186 that may be used by a control system to operate the multi-process welding power supply 12 in conjunction with the pendant 42. First, the control system checks whether the supply cable, which communicatively couples the pendant 42 and the power supply unit 12 during operation, is connected to the power supply unit 12 as indicated by block 188. If the supply cable is not connected to the power supply unit 12, the controls located on the power supply unit 12 are enabled, as indicated by block 190, and the user may set the welding process, set the voltage, and so forth, via the interface 24 on the power supply unit 12. If the supply cable is connected to the power supply unit 12, the control system disables controls on the power supply interface 24 that are redundant with controls on the pendant interface 150, as indicated by block 192. In this way, activation of the pendant 42 and its associated user interface 150 leads to deactivation of similar controls located on the power supply unit 12 such that all process control selection is relegated to the pendant 42 during operation. As noted above, this process may be implemented for manual control of which interface is enabled, and for which operations or parameters.

The control system may then inquire as to whether a TIG process is selected on the interface 150 located on the pendant 42, as indicated by block 194. If a TIG process has been selected, the control system will set a constant current process mode, as indicated by block 196, and set the polarity as DCEN, as indicated by block 198. Furthermore, the control system will disable the wire feeder, as indicated by block 200, and enable a gas flow suitable for a TIG welding process, as indicated by block 202. In this way, the user selection of the TIG process on the pendant 42 triggers the correct settings. The selection and any particular settings for the TIG process are then communicated from the pendant to the power supply unit, which then outputs appropriate power in accordance with the selections and settings. Such selection and setting data may be communicated via a dedicated data conductor as discussed above, or in certain embodiments along one of the welding power conductors.

If a TIG process has not been selected, the control system may then inquire as to whether a MIG process is selected, as indicated by block 204. If a MIG process has been selected, the control system will set a constant voltage process, as indicated by block 206, and set a polarity as DCEP, as indicated by block 208. Furthermore, the control system will enable the wire feeder, as indicated by block 210, and enable a second gas flow suitable for a MIG process, as indicated by block 212. That is, the user selection of the MIG process on the pendant 42 automatically triggers the correct process parameters and supplies, such as gas and wire. As in the former case, the data regarding the selection of the process, and any settings to be implemented in the process are communicated to the power supply unit, which then provides welding power in accordance with the selections and settings.

Similarly, if a MIG process has not been selected, the control system may then inquire as to whether a stick welding process is selected, as indicated by block 214. If a stick welding process has been selected, the control system will set a constant current process, as indicated by block 216, and set a polarity as DCEP, as indicated by block 218. Furthermore, the control system will disable the wire feeder, as indicated by block 220, and disable gas flow, as indicated by block 222. As before, the selection, and any settings to be used for stick welding are communicated to the power supply unit, which outputs the requested power. If the stick welding process has not been selected, the control system may again inquire as to whether a TIG process is selected, as indicated by block 194. In this way, in the illustrated embodiment, the control system continues to cycle through inquiries 194, 204, and 214 until the user selects a process.

As noted above, in all of the foregoing cases, the control system, if separate setting controls are provided on the pendant, the control system will collect information from those inputs for the regulation of power to the welding operation. For example, in certain embodiments, the pendant may permit the adjustment of currents and/or voltages for welding. As also noted above, these inputs may be sampled in the pendant and communicated to the welding power supply via a data conductor, if provided in the cable assembly, although in certain presently contemplated embodiments, such data may also be communicated over the welding power conductors. Similarly, when a wire feeder is included in the pendant, or controlled by the pendant, wire feed speeds may be set for MIG welding directly on the pendant or on the wire feeder. These inputs, too, may be handled by the control circuitry of the pendant for regulation of wire spooling to the MIG torch.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A remotely controlled welding system comprising:
   a power supply unit comprising a first user interface comprising one or more control devices that enable a user to select a remote option, to enable output of power from the power supply unit at either a first polarity or a second polarity opposite from the first polarity, or to set a welding process;
   a pendant located remotely with respect to the power supply unit and comprising:
      a second user interface comprising one or more additional control devices that are configured to be enabled when the user selects the remote option, wherein the additional control devices enable the user to enable the output of power from the power supply unit at the first polarity or the second polarity, or to set the welding process;
      at least one output terminal having a reversible output that may be enabled at the first polarity or reversed to the second polarity; and
      control circuitry configured to enable the reversible output of the output terminal at the first polarity or at the second polarity depending on the welding process set by the user via the first user interface or the second user interface; and
   a supply cable that communicatively couples the power supply unit to the pendant.

2. The remotely controlled welding system of claim 1, wherein the supply cable comprises a power lead and one or more gas conduits.

3. The remotely controlled welding system of claim 2, wherein the supply cable further comprises one or more data conductors for bidirectionally transmitting information between the pendant and the power supply unit.

4. The remotely controlled welding system of claim 2, wherein the supply cable includes one or more gas conduits for one or more different gases used in one or more different welding processes selectable on the pendant.

5. The remotely controlled welding system of claim 1, wherein the pendant comprises a wire feeder.

6. The remotely controlled welding system of claim 1, wherein the welding process comprises a tungsten inert gas (TIG) welding process.

7. The remotely controlled welding system of claim 6, wherein the welding process comprises a metal inert gas (MIG) welding process.

8. The remotely controlled welding system of claim 6, wherein the welding process is a constant current welding process, a constant voltage welding process, or a combination thereof.

9. The remotely controlled welding system of claim 6, wherein the control circuitry is configured to automatically disable a subset of the one or more control devices on the first user interface and enable the second user interface when the pendant is coupled to the power supply unit via the supply cable, wherein the subset of the one or more control devices comprises controls that are redundant with the one or more additional control devices on the second user interface.

10. The remotely controlled welding system of claim 1, wherein the first polarity is a direct current electrode positive (DCEP) polarity.

11. The remotely controlled welding system of claim 1, wherein the second polarity is a direct current electrode negative (DCEN) polarity.

12. The remotely controlled welding system of claim 5, wherein the pendant comprises a first output terminal configured to receive a lead for a MIG torch or a stick stinger and a second output terminal configured to receive a lead for a TIG torch.

13. A remotely controlled welding system comprising:
a power supply unit comprising a first user interface comprising one or more control devices that enable a user to enable output of power from the power supply unit at either a first polarity or a second polarity opposite from the first polarity, or to set a welding process;
a pendant located remotely with respect to the power supply unit and comprising:
a second user interface comprising one or more additional control devices that are configured to be enabled to enable the user to enable the output of power from the power supply unit at the first polarity or the second polarity, or to set the welding process;
at least one output terminal having a reversible output that may be enabled at the first polarity or reversed to the second polarity; and
control circuitry configured to enable the reversible output of the output terminal at the first polarity or at the second polarity, and to disable a subset of the one or more control devices on the first user interface when the second user interface is enabled, wherein the subset of the one or more control devices comprises controls that are redundant with the one or more additional control devices on the second user interface; and
a supply cable that communicatively couples the power supply unit to the pendant.

14. The remotely controlled welding system of claim 13, wherein the first polarity is a direct current electrode positive (DCEP) polarity, and the second polarity is a direct current electrode negative (DCEN) polarity.

15. A pendant remotely located from a power supply unit comprising:
a first output terminal having a reversible output that may be enabled at a first polarity or reversed to a second polarity opposite from the first polarity;
a second output terminal having a second reversible output that may be enabled at the first polarity or reversed to the second polarity opposite from the first polarity;
a selector configured to enable a user to select at least between a first welding process requiring the first polarity and a second welding process requiring the second polarity, and to further enable the user to designate one of the first output terminal and the second output terminal as a desired active terminal; and
control circuitry configured to receive data from the selector corresponding to the user selected process and the desired active terminal, to enable the output of the desired active terminal at one of the first polarity or the second polarity depending on the polarity of the user selected process, and to electrically isolate one of the first output terminal or the second output terminal that is not the desired active terminal.

16. The pendant of claim 15, wherein the first welding process is a constant current process and the second welding process is a constant voltage process.

17. The pendant of claim 15, wherein the pendant comprises a wire feeder enabled when a MIG process is selected.

18. The pendant of claim 15, wherein the pendant is configured to disable control inputs on the power supply unit which are redundant with controls on the pendant, including selection of the first or second welding process.

19. The pendant of claim 15, wherein the pendant is configured to supply a signal to the power supply unit to select between supply of one or more different gases based upon which of the first and second welding processes is selected.

20. The pendant of claim 17, wherein the first output terminal is configured to receive a lead for a MIG torch or a stick stinger and the second output terminal is configured to receive a lead for a TIG torch.

* * * * *

UNITED STATES PATENT AND TRADEMARK OFFICE
CERTIFICATE OF CORRECTION

PATENT NO. : 8,330,077 B2
APPLICATION NO. : 12/553796
DATED : December 11, 2012
INVENTOR(S) : James Francis Rappl et al.

It is certified that error appears in the above-identified patent and that said Letters Patent is hereby corrected as shown below:

The name of the second listed inventor should be changed from "Thomas. D. Ihde" to "Thomas D. Lahti".

Signed and Sealed this
Twelfth Day of February, 2013

Teresa Stanek Rea
*Acting Director of the United States Patent and Trademark Office*